(No Model.)

2 Sheets—Sheet 1.

W. BAYLEY.
GRAIN CONVEYING APPARATUS.

No. 251,334.　　　　　　　　　　Patented Dec. 20, 1881.

Witnesses.　　　　　　　　　　Inventor.
Lewis Tomlinson　　　　　　　　Wm Bayley
Chas. W. Baldwin　　　　　　　by Ridout Airdobo.
　　　　　　　　　　　　　　　Attys (No Model.) 2 Sheets—Sheet 2.

W. BAYLEY.
GRAIN CONVEYING APPARATUS.

No. 251,334. Patented Dec. 20, 1881.

Witnesses.
Lewis Tomlinson
Chas. W. Baldwin

Inventor.
Wm Bayley
by Ridout Aird &c
Attys

UNITED STATES PATENT OFFICE.

WILLIAM BAYLEY, OF SPRINGFIELD, OHIO, ASSIGNOR TO WHITELEY, FASSLER & KELLY, OF SAME PLACE.

GRAIN-CONVEYING APPARATUS.

SPECIFICATION forming part of Letters Patent No. 251,334, dated December 20, 1881.

Application filed January 3, 1881. (No model.)

*To all whom it may concern:*

Be it known that I, WILLIAM BAYLEY, a citizen of the United States of America, residing at Springfield, in the county of Clarke and State of Ohio, have invented a new and useful Grain-Conveying Apparatus, of which the following is a specification.

My invention relates, first, to stripping-fingers placed between the horizontal and elevating conveyers to strip the grain off the horizontal belt and hold it for the elevating rake-teeth, thus preventing the grain following the downward motion of the horizontal belt; secondly, to a vertical revolving folding-tooth rake-head placed at the front edge of the machine, at the point where the two conveyers intersect, and provided with teeth operated by a cam-groove, as hereinafter explained, this vertical rake being placed at the point named for the purpose of assisting the conveying of the grain across and upward, preventing the clogging of the grain at this point, which might otherwise occur.

Figure 1:
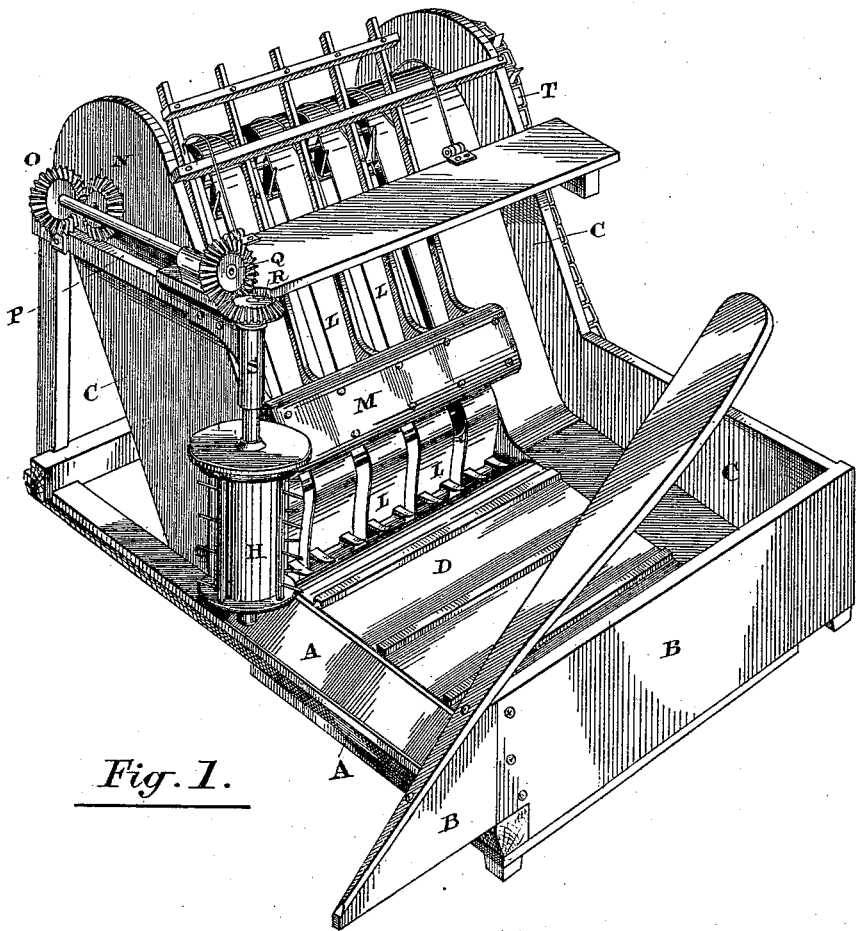
Figure 2:
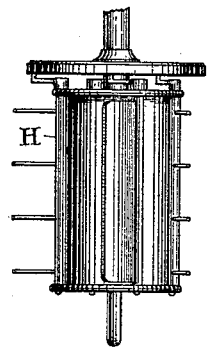
Figure 3:
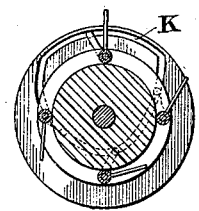
Figure 4:
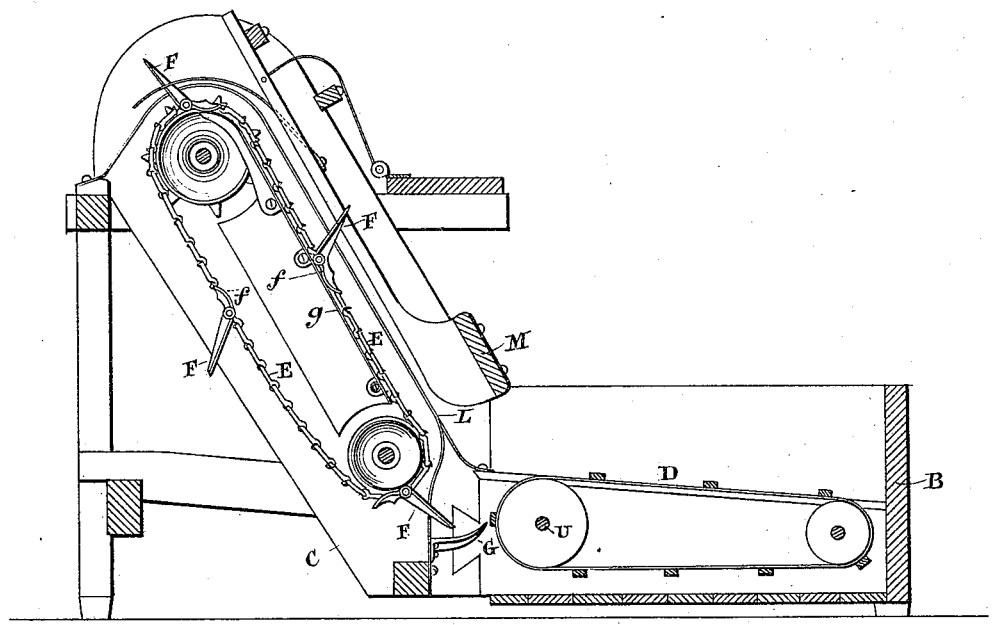
Figure 5:
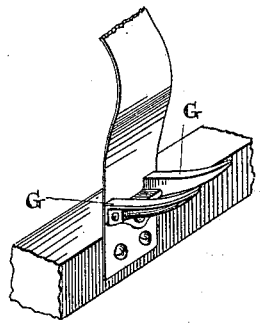

In the drawings, Figure 1 represents a perspective front view of the horizontal and elevating conveyers, with vertical falling toothed rake and gathering-fingers between the horizontal and upright conveyers. Fig. 2 represents the vertical folding-tooth rake. Fig. 3 represents the cam-track which guides and gives motion to the folding-tooth rakes by means of cranks attached. Fig. 4 represents a cross-section, showing the relative positions of horizontal and elevating conveyers and the gathering-fingers as located between the two conveyers. Fig. 5 represents the gathering-fingers as attached to the lower end of shield.

In the drawings like letters indicate corresponding parts in each figure.

A is the finger-bar of the harvester; B, the divider; C, the frame-work of the conveyers; D, the horizontal belt-conveyer; E, the vertical endless-chain rake-conveyer; F, the falling teeth of the same; G, the gathering-fingers; H, the vertical revolving folding-tooth rake, and K the cam-track for guiding and controlling the rake-teeth. L are the shields over the endless-chain conveyer. M is the float. N and O represent a pair of bevel-wheels, one arranged upon a cross-shaft, P, in front of the machine. Q and R represent another pair of bevel-wheels, one arranged upon the cross-shaft P and the other upon the vertical shaft S, communicating motion to the vertical revolving folding-tooth rake from the upper shaft of the elevating-conveyer rakes. T represents the chain connecting the two driving-shafts of the two conveyers together, the two conveyers D and E and vertical rake H being thus driven simultaneously.

Having described the several parts of my improved grain-conveying mechanism, I will now explain the operation.

The general form of the machine is so well known that a detailed description of it is not necessary. Suffice it to say that motion is communicated by any of the well-known mechanical contrivances to the upper shaft of the falling-tooth endless-chain conveyer, giving a continuous motion to the said shaft, and in turn to the said endless chain T. The chain T communicates motion from the upper shaft of the elevating-conveyer to the driving-shaft U of the horizontal belt-conveyer. As the grain is cut it falls upon the conveyer-belt D, and this belt, having a fast motion, conveys the grain quickly across the machine in rear of the cutters, where it is arrested from passing down by the fingers G, which are attached to the shield-plates L, and are thereby rendered slightly elastic, while they are in themselves rigid. The elevating falling toothed rakes F pick the grain off these fingers, and, conveying it upward under the float M, discharge it into a proper receiver or grain-receptacle, to be operated upon by the binding mechanism. The falling teeth F swing out, as shown, to receive the grain off of the conveyer-belt D and fingers G, and convey the grain to the top of the elevator, when these teeth, withdrawing themselves from the grain, turn down. The vertical revolving folding-tooth rake H gathers the grain backward from the knife and conveying-belt E and assists in the upward movement at a point where heretofore it has been difficult to continue the uninterrupted flow of grain.

It will be noticed that the falling teeth F are each provided with a heel, *f*, which comes in contact with a hub or projection on the lower roller of the conveyer E, throwing the teeth out as they approach the fingers G. After passing this roller the heel $f$ rests upon a plate, $g$, which keeps the teeth F in a vertical position till the top of the conveyer is reached, when the plate $g$ ceases, permitting the teeth F to fall back, withdrawing themselves from the grain, as before explained.

The combination and working of the several parts are such as to gather the grain, as fast as cut, in good condition for automatic grain-binding machinery, which is arranged to receive and bind the same, but is not here shown, having been previously described in other applications made by me for Letters Patent.

What I claim as my invention is—

1. The stripping or gathering fingers G, attached to the shield L and unattached at their outer ends, situated between and in combination with the continuously-revolving conveyers D and E, substantially as shown, and for the purpose specified.

2. Combined with the conveyer D and falling-tooth elevator E, the shield-plates L and teeth G G, cast integral in pairs and bolted to said shield above its point of attachment to the frame.

3. A vertical revolving folding-tooth rake, H, located at or near the point where the conveyers D and E intersect, in combination with the horizontal conveyer D and vertical conveyer E, arranged and operating substantially as and for the purpose specified.

WILLIAM BAYLEY.

Witnesses:
HENRY MILLWARD,
A. N. SUMMERS.